United States Patent
Nishitani et al.

(10) Patent No.: US 9,103,521 B2
(45) Date of Patent: Aug. 11, 2015

(54) LIGHTING APPARATUS AND LIGHTING FITTING

(75) Inventors: Daisuke Nishitani, Kariya (JP); Takahito Nishii, Nagoya (JP); Tsutomu Kamizono, Nagoya (JP); Takahiro Nakano, Kariya (JP)

(73) Assignee: DENSO CORPORATION, Kariya (JP)

( * ) Notice: Subject to any disclaimer, the term of this patent is extended or adjusted under 35 U.S.C. 154(b) by 831 days.

(21) Appl. No.: 13/337,554

(22) Filed: Dec. 27, 2011

(65) Prior Publication Data

US 2012/0161633 A1 Jun. 28, 2012

(30) Foreign Application Priority Data

Dec. 27, 2010 (JP) .................................. 2010-290905

(51) Int. Cl.
| F21S 8/10 | (2006.01) |
|---|---|
| F21V 23/00 | (2015.01) |
| F21V 29/02 | (2006.01) |
| H05B 33/08 | (2006.01) |
| B60Q 1/00 | (2006.01) |
| B60Q 1/08 | (2006.01) |
| B60Q 1/14 | (2006.01) |
| B60Q 11/00 | (2006.01) |

(Continued)

(52) U.S. Cl.
CPC ............ *F21S 48/325* (2013.01); *B60Q 1/0023* (2013.01); *B60Q 1/085* (2013.01); *B60Q 1/143* (2013.01); *B60Q 11/005* (2013.01); *F21S 48/1104* (2013.01); *F21S 48/1159* (2013.01); *F21S 48/328* (2013.01); *F21V 23/007* (2013.01); *F21V 29/02* (2013.01); *F21V 29/71* (2015.01); *F21V 29/763* (2015.01); *H05B 33/0851* (2013.01); *H05B 33/0854* (2013.01); *B60Q 2300/14* (2013.01); *F21Y 2101/02* (2013.01)

(58) Field of Classification Search
USPC .................. 315/309, 307, 291, 224, 185 S
See application file for complete search history.

(56) References Cited

U.S. PATENT DOCUMENTS

2007/0025117 A1 2/2007 Watanabe et al.
2008/0273331 A1* 11/2008 Moss et al. .................... 362/294

(Continued)

FOREIGN PATENT DOCUMENTS

| CN | 101442859 | 5/2009 |
|---|---|---|
| CN | 201599762 | 10/2010 |

(Continued)

OTHER PUBLICATIONS

Office action dated Oct. 22, 2013 in corresponding Japanese Application No. 2010-290905.
Office action dated Feb. 19, 2013 in corresponding Japanese Appication No. 2010-290905.

(Continued)

*Primary Examiner* — Tuyet Vo
(74) *Attorney, Agent, or Firm* — Harness, Dickey & Pierce, PLC

(57) ABSTRACT

A lighting apparatus is provided which includes a drive section which applies electric current to a light source which is a semiconductor element emitting light with application of electric current, at least one heat sink which is mounted with the light source and transfers heat generated by the emission of the light source, and a temperature measurement section which is mounted to the heat sink and measures temperature of the heat sink which is used for estimating temperature of the light source. The light source and the drive section are mounted to the same heat sink or to the heat sinks which are thermally coupled to each other.

8 Claims, 16 Drawing Sheets

(51) Int. Cl.
*F21V 29/71* (2015.01)
*F21V 29/76* (2015.01)
*F21Y 101/02* (2006.01)

(56) References Cited

U.S. PATENT DOCUMENTS

2009/0160344 A1* 6/2009 Hsu et al. .............. 315/117
2010/0134047 A1* 6/2010 Hasnain ................. 315/302
2011/0304268 A1* 12/2011 Bertram et al. .......... 315/46
2013/0082600 A1* 4/2013 Ter-Hovhanissian ..... 315/112

FOREIGN PATENT DOCUMENTS

| JP | 2001-043728 | 2/2001 |
| JP | 2005-063754 | 3/2005 |
| JP | 2005-277879 | 10/2005 |
| JP | 2006-286395 | 10/2006 |
| JP | 2007-035547 | 2/2007 |

OTHER PUBLICATIONS

Office action dated Jan. 2, 2014 in corresponding Chinese Application No. 2011 10444668.1.

* cited by examiner

LIGHTING APPARATUS AND LIGHTING FITTING

CROSS-REFERENCE TO RELATED APPLICATION

This application is based on and claims the benefit of priority from earlier Japanese Patent Application No. 2010-290905 filed Dec. 27, 2010, the description of which is incorporated herein by reference.

BACKGROUND OF THE INVENTION

1. Technical Field of the Invention

The present invention relates to a lighting apparatus for lighting a light source and to a lighting fitting, and in particular to a lighting apparatus which is favorably used with LEDs (light emitting diodes) that serve as light sources and to a lighting fitting.

2. Related Art

Recently, semiconductor light sources, such as LEDs, have come into practical use as light sources of lighting fittings. Thus, lighting fittings using LEDs as light sources have come to be widely used. For example, as disclosed in JP-A-2007-035547, vehicle headlights are also suggested to use LEDs as light sources.

The life-span of LEDs is long compared to that of incandescent lamps of conventional art. LEDs are advantageous in that maximum quantity of light is available upon turning on the LEDs but are disadvantageous in that LEDs have a low tolerance for heat. For example, the temperature of a LED is raised by the heat generated with the emission of light from the LED. As a result, the element of the LED will be deteriorated to make the life-span of the LED shorter than the intrinsic life-span, or reduce the quantity of light emitted from the LED.

In this regard, the vehicle headlights disclosed in the above patent document JP-A-2007-035547 use a bracket as a heat sink, which is obtained by die-casting aluminum. Specifically, LEDs as light sources are mounted to such a bracket to discharge heat generated by the LEDs. With this configuration, temperature of the LEDs at the time of emitting light is suppressed from being raised.

A lighting fitting using LEDs as light sources is provided with a drive circuit used for turning on the LEDs. The drive circuit is separately provided being distanced from the LEDs. The drive circuit includes a temperature measurement section that measures temperature of the LEDs. The heat generated by each LED in emitting light is discharged from the LED to the air in the interior of the lighting fitting via a heat sink, such as a bracket. The heat transmitted to the air is dispersed in the entire interior of the lighting fitting by natural convection. The dispersed heat is measured by the temperature measurement section. In other words, the temperature measurement section measures temperature of the LEDs via the heat sink and the air in the interior of the lighting fitting.

The method set forth above for measuring temperature of LEDs via a heat sink and the air in the interior of a lighting fitting has suffered from a problem that the measurement is easily affected by external factors because the path used for temperature transmission is long, and thus it is difficult to accurately measure the temperature of the LEDs. In addition, the method has also suffered from a problem that, when the temperature of the LEDs changes, it takes time to measure the change of the temperature because the speed of transmission of the LEDs' temperature is slow.

SUMMARY OF THE INVENTION

An embodiment provides a lighting apparatus and a lighting fitting which enable measurement of temperature of light sources with high accuracy.

As an aspect of the embodiment, a lighting apparatus is provided which includes: a drive section which applies electric current to a light source which is a semiconductor element emitting light with application of electric current; at least one heat sink which is mounted with the light source and transfers heat generated by the emission of the light source; and a temperature measurement section which is mounted to the heat sink and measures temperature of the heat sink which is used for estimating temperature of the light source. The light source and the drive section are mounted to the same heat sink or to the heat sinks which are thermally coupled to each other.

DETAILED DESCRIPTION OF THE PREFERRED EMBODIMENTS

[First Embodiment]

With reference to the accompanying drawings, hereinafter are described some embodiments of the present invention.

Figure 1:
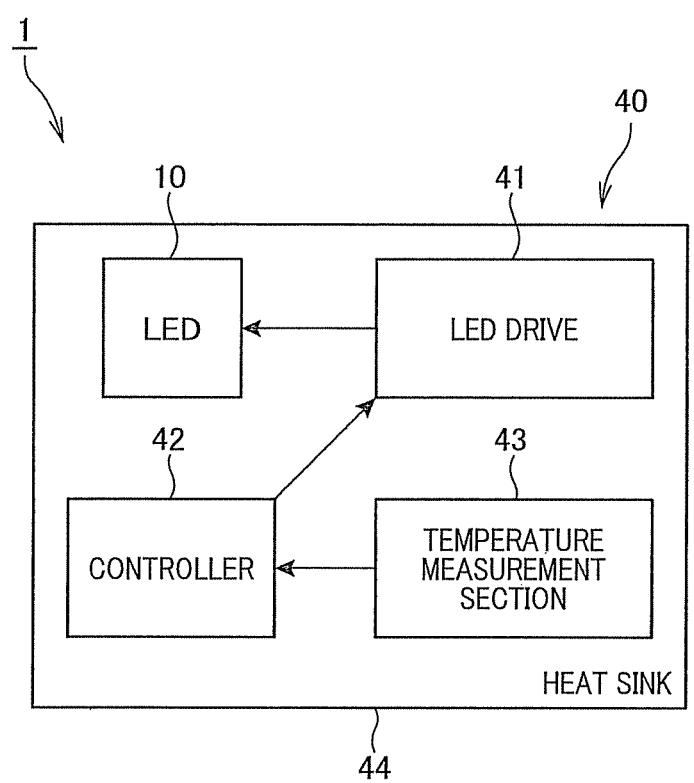
FIG. 1 is a block diagram illustrating the configuration of a vehicle lighting fitting according to a first embodiment of the present invention.
Figure 2:
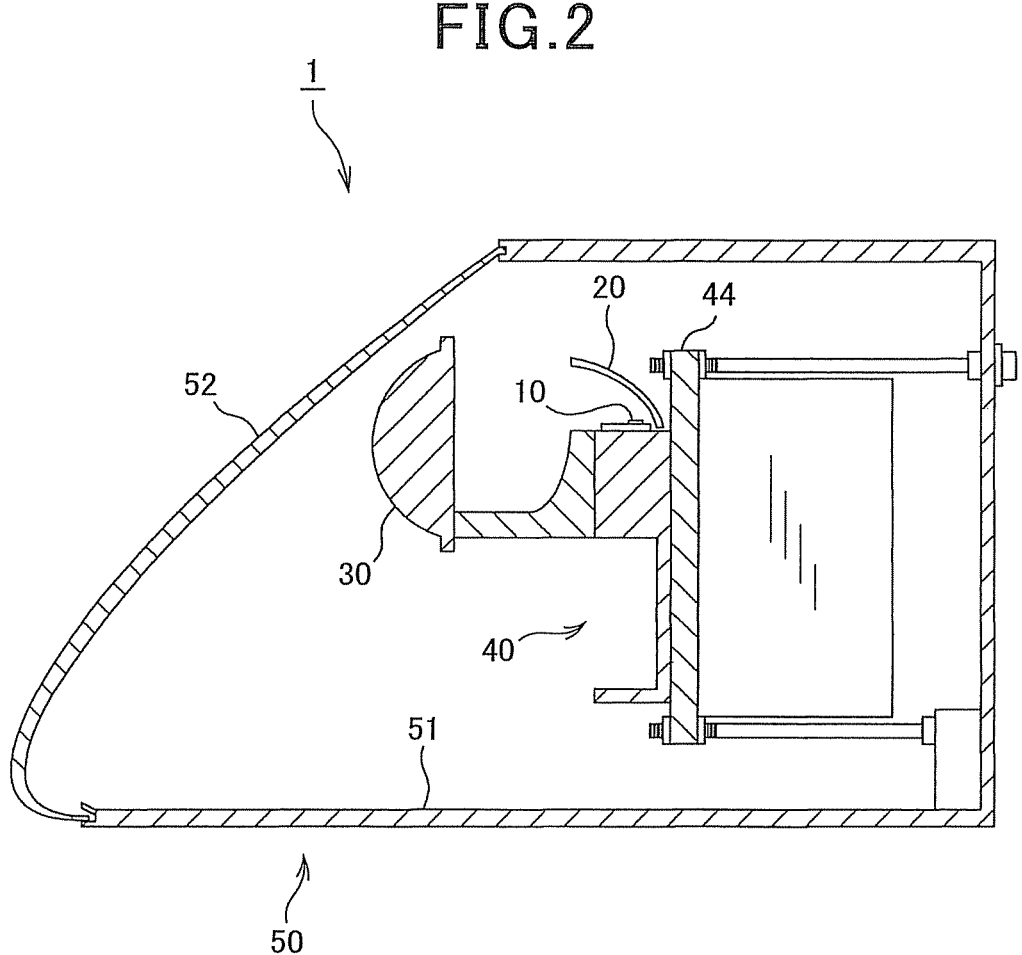
FIG. 2 is a cross-sectional view illustrating the configuration of the vehicle lighting fitting illustrated in FIG. 1.
Figure 3:
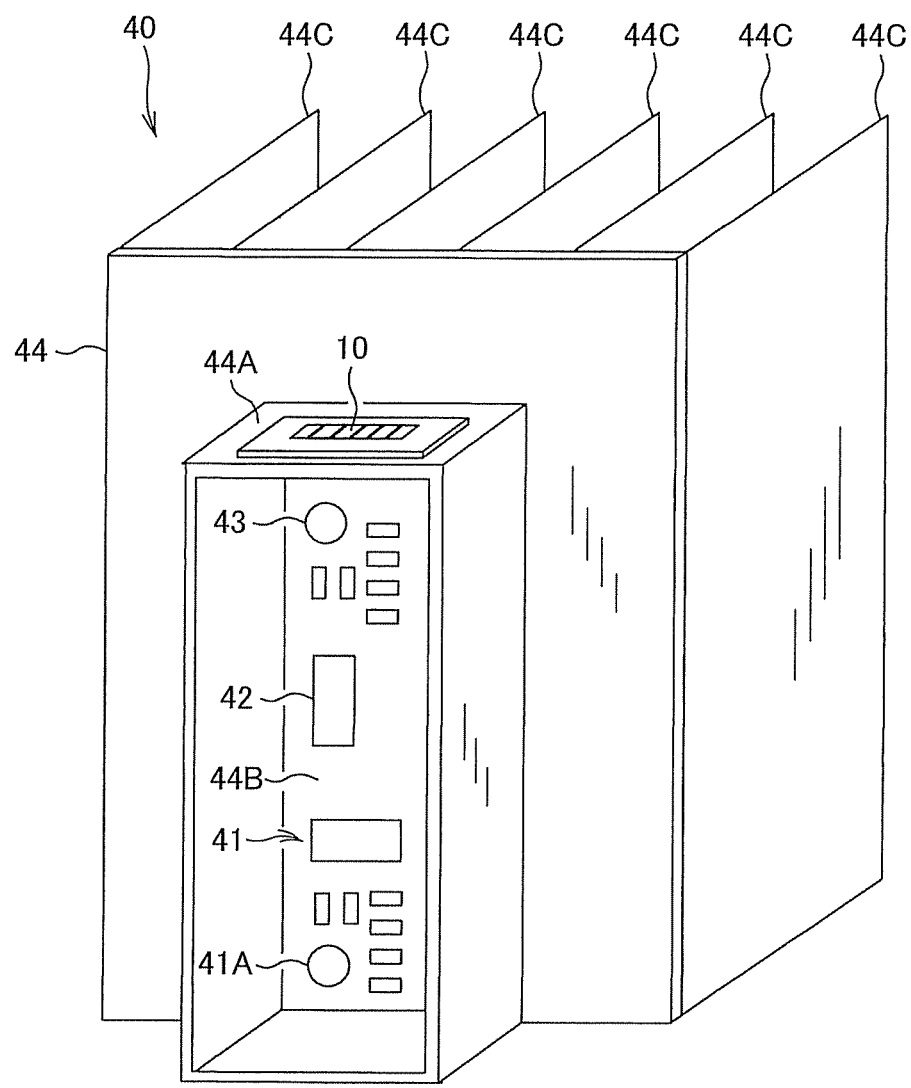
FIG. 3 is a perspective view illustrating the configuration of a lighting apparatus illustrated in FIG. 1 or 2.
Figure 4:
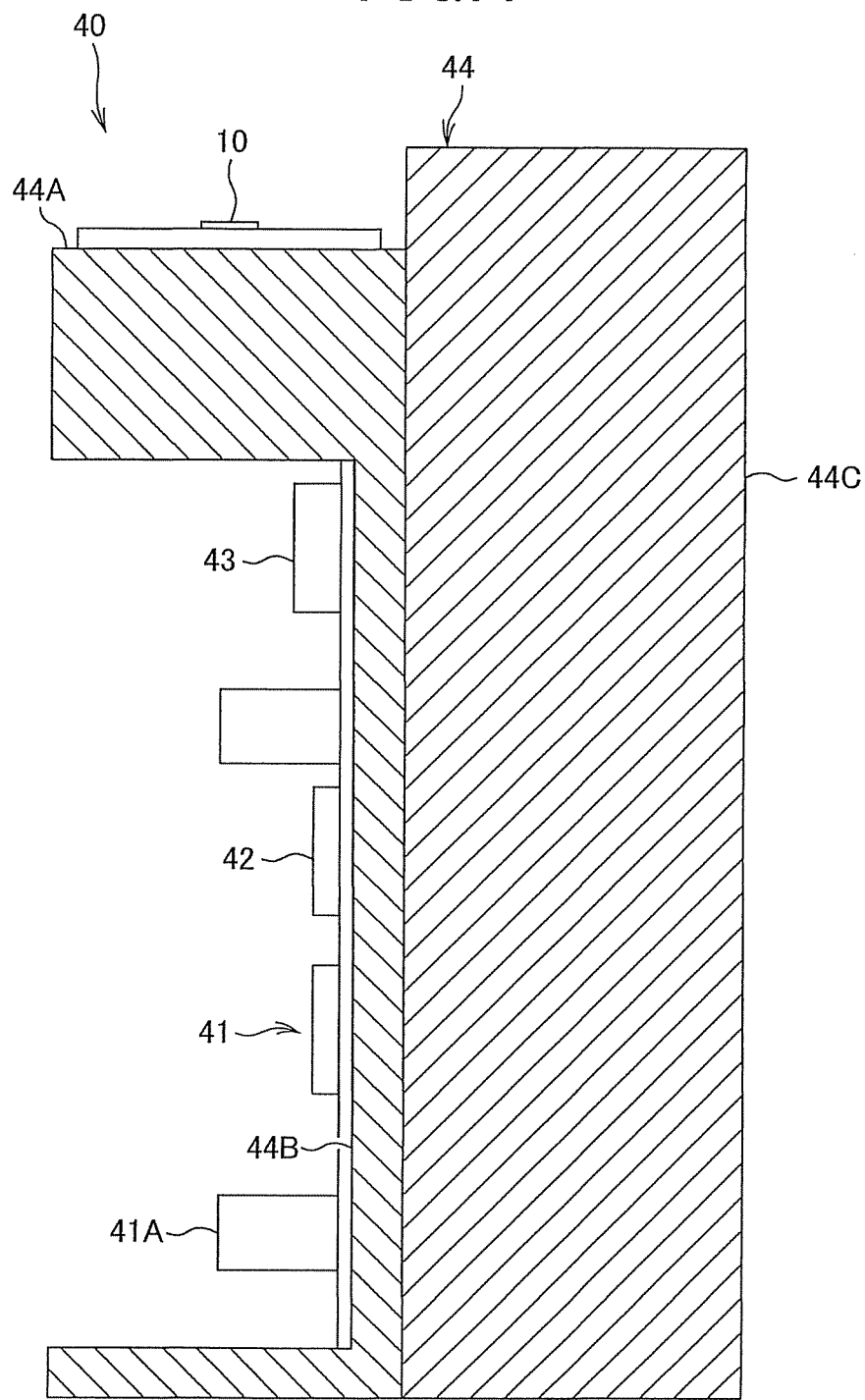
FIG. 4 is a cross-sectional view illustrating the configuration of the lighting apparatus illustrated in FIG. 3.

Referring to FIGS. 1 to 4, first, a vehicle lighting fitting according to a first embodiment of the present is described. FIG. 1 is a block diagram illustrating the configuration of a vehicle lighting fitting 1 according to the first embodiment. FIG. 2 is a cross-sectional view illustrating the configuration of the vehicle lighting fitting 1 illustrated in FIG. 1. FIG. 3 is a perspective view illustrating the configuration of a lighting apparatus 40 illustrated in FIG. 1 or 2. FIG. 4 is a cross-sectional view illustrating the configuration of the lighting apparatus 40 illustrated in FIG. 3.

The vehicle lighting fitting 1 (hereinafter also just referred to as "lighting fitting 1") of the present embodiment is used as each of headlights for illuminating the forward direction of a vehicle equipped with the lighting fittings 1. Each of the headlights uses LEDs as light sources. As shown in FIGS. 1 and 2, the lighting fitting 1 includes LEDs (light sources) 10, reflectors 20 for the respective LEDs, lens 30 for the respective LEDs, the lighting apparatus 40 and a casing 50.

Each LED 10 emits light with the application of electric current. The luminous flux emitted from the LED 10, i.e. light output, is increased as the electric current applied to the LED 10 is increased. When an electric current of a level is applied to the LED 10, the light output of the LED 10 is decreased as the temperature of the LED 10 becomes higher.

The reflector 20 and the lens 30 are optical members that direct the light emitted from the LED 10 so as to be emitted toward a predetermined direction which is the forward direction of the lighting fitting 1 in the present embodiment. The reflector 20, upon which the light emitted from the LED 10 is incident first, reflects the incident light toward the lens 30.

In the present embodiment, the reflector 20 is arranged above each LED 10 to reflect the light emitted upward (upper direction in FIG. 2) from the LED 10 in the horizontal direction (leftward direction in FIG. 2). The reflector 20 is concavely curved with its center being distanced from the LED 10, as viewed in the cross section, to reflect light by the recessed, or, the concavely curved surface.

The lens 30 functions such that the light reflected from the reflector 20 is illuminated in a desired area in the forward direction of the lighting fitting 1. The lens 30, which is made of a translucent material that transmits light, has a frontward (left side in FIG. 2) surface with respect to the lighting fitting 1, the surface being curved and projected forward.

As shown in FIG. 2, the casing 50 configures an outline of the lighting fitting 1. The casing 50 has an interior for accommodating the LEDs 10, the reflectors 20, the lenses 30, the lighting apparatus 40 and the like. The casing 50 includes a transmission member 52 and a main body 51. The transmission member 52 forms the front surface of the lighting fitting 1 and transmits light therethrough. The main body 51 forms the side and rear surfaces of the lighting fitting 1. The LEDs 10, the reflectors 20, the lenses 30, the lighting apparatus 40 and the like are mounted to the main body 51. The light emitted from each LED 10 is transmitted through the transmission member 52 for emission in the forward direction of the lighting fitting 1.

The lighting apparatus 40 lights the LEDs 10 and controls light output of the LEDs 10. As will be seen from FIGS. 1 to 4, the lighting apparatus 40 includes an LED drive (drive section) 41, a controller 42, a temperature measurement section 43 and a heat sink 44.

The LED drive 41 serves as a power supply circuit that supplies current to be applied to the LEDs 10. The LED drive 41 also serves as a circuit for controlling current and voltage applied to the LEDs 10 based on a control signal inputted from the controller 42. The LED drive 41 is mounted on a substrate together with the controller 42 and the temperature measurement section 43, so that heat is transmitted to the heat sink 44. In the circuit configuring the LED drive 41, a heat generating portion 41A, where elements generating large amounts of heat are arranged, is located at a position distanced from the temperature measurement section 43, e.g. located at a lower part of FIG. 4.

The controller 42 serves as a processor that reads various programs written into an incorporated memory and executes each read program to process various pieces of information. For example, the controller 42 controls the temperature of the LEDs 10 at the time of emitting light so as not to exceed a predetermined temperature that guarantees light emission of the LEDs 10. More preferably, the controller 42 controls the temperature of the LEDs 10 to a level that falls within a predetermined temperature range which is lower than the predetermined temperature.

The temperature measurement section 43 is arranged near the LEDs 10 and measures temperature of the heat sink 44. The present embodiment is described taking as an example the case where a temperature measurement element, such as a thermistor, is used as the temperature measurement section 43.

The heat sink 44 is made of metal, such as aluminum, having high heat conductivity or an alloy of metals having high heat conductivity and has a function of releasing heat generated when the LEDs 10 are lit. Also, the heat sink 44 has a function of releasing heat generated by the LED drive 41, or, in particular, generated by the heat generating portion 41A. The heat sink 44 includes a light source mounting surface 44A, a circuit mounting member 44B and a plurality of fins 44C. The light source mounting surface 44A is mounted with the LEDs 10 in a manner of enabling transfer of the heat generated by the LEDs 10. The circuit mounting member 44B is mounted with the LED drive 41, the controller 42 and the temperature measurement section 43. The plurality of fins 44C are used for releasing heat.

The circuit mounting member 44B and the light source mounting surface 44A are portions of a member that has a shape of a bottomed square cylinder (see FIG. 3). The circuit mounting member 44B corresponds to the bottom surface of the bottomed square cylinder member, while the light source mounting surface 44A corresponds to the outer surface of the upper side (as viewed in FIG. 3) of the bottomed square cylinder member. The bottomed square cylinder member is arranged with its opened side being directed in the forward direction of the lighting fitting 1. The plurality of fins 44C, each being made up of a plate-shaped member, are juxtaposed in the lateral direction and extended in the rearward direction of the lighting fitting 1.

Hereinafter is described a lighting process performed in the lighting fitting 1 having the configuration described above.

When the driver of the vehicle lights the lighting fitting 1 such as by turning on a headlight switch, an instruction for the lighting is inputted to the controller 42. As shown in FIG. 1, upon reception of the instructions, the controller 42 outputs a control signal to the LED drive 41 to start application of current to the LEDs 10. Then, the LED drive 41 starts application of current to the LEDs 10 while controlling the levels of current and voltage according to a predetermined pattern. Upon application of current, each LED 10 starts emitting light toward the reflector 20 arranged above. The light emitted from each LED 10 is reflected by the reflector 20 toward the lens 30. In transmitting through the lens 30, the reflected light is refracted for the illumination of a desired area. The light that has transmitted through the lens 30 further transmits through the transmission member 52 of the casing 50 for the emission external of the lighting fitting 1 to thereby illuminate the desired area in the forward direction of the vehicle.

The light emission in the LEDs 10 accompanies generation of heat. A greater part of the generated heat is transferred to the light source mounting surface 44A, i.e. the heat sink 44, which is in contact with the LEDs 10 in a manner of enabling heat transfer. The heat transferred to the heat sink 44 is diffused in the heat sink 44, while the heat transferred to the plurality of fins 44C is released into the air around the fins 44C.

On the other hand, the temperature measurement section 43 arranged near the LEDs 10 measures the temperature of the heat sink 44, which has been raised with the reception of heat generated by the LEDs 10, and outputs a measurement signal indicative of a measured temperature. The temperature of the heat sink 44 depends on the portion of the heat sink 44. Specifically, the temperature of the heat sink 44 becomes higher at a portion as the portion is positioned nearer to an area where heat is transferred, and becomes lower as the portion is positioned farther from the area where heat is transferred. Accordingly, the temperature of the heat sink 44 becomes higher at a portion as the portion is positioned nearer to the light source mounting surface 44A to which the heat from the LEDs 10 is transferred.

Also, as the heat sink 44 is distanced from heat sources (e.g., the heat generating portion 41A) other than the LED 10, the influence of the temperature rise due to the heat transferred from the heat sources to the heat sink 44 becomes smaller. In other words, as the temperature measurement section 43 is located nearer to the LEDs 10, the temperature measurement section 43 is able to more accurately measure the temperature change of the heat sink 44 caused by the LEDs 10.

The measurement signal outputted from the temperature measurement section 43 is inputted to the controller 42. The controller 42 then calculates the temperature, which has been measured by the temperature measurement section 43, from the measurement signal and estimates the temperature of the LEDs 10 based on the calculated temperature. The heat sink 44 made of metal, such as aluminum, has a temperature distribution therein that can be highly accurately detected in advance through a process such as of simulation or experiments compared to the temperature distribution such as in the air that causes convection or the like.

For example, the memory of the controller 42 stores a table that indicates a correlation between pre-calculated temperature at a position where the temperature measurement section 43 is arranged and temperature of the LEDs 10. Thus, the controller 42 is able to estimate the temperature of the LEDs 10 based on the stored table.

The process of temperature estimation of the LEDs 10 performed by the controller 42 is not particularly limited to the one based on a table stored in a memory as mentioned above. Alternative to this, for example, the controller 42 may estimate the temperature of the LEDs 10 through a calculation based on an algorithm.

The controller 42 compares the estimated temperature of the LEDs 10 with a predetermined temperature. If the estimated temperature of the LEDs 10 exceeds the predetermined temperature, the controller 42 outputs a control signal to the LED drive 41 to lower the level of the current applied to the LEDs 10. When the LEDs 10 include those LEDs 10 which generate a larger quantity of heat in emitting light, the above configuration enables control of the temperature of all the LEDs 10 to be not more than the predetermined temperature. If the estimated temperature of the LEDs 10 is equal to or less than the predetermined temperature, the LEDs 10 are permitted to continuously emit light without the change of the level of the current applied to the LEDs 10.

According to the configuration described above, the heat generated by the LEDs 10 is transferred to the heat sink 44, and the heat transferred to the heat sink 44 is measured by the temperature measurement section 43. In other words, the temperature of the LEDs 10 is measured by the temperature measurement section 43 not via a fluid, such as air, but via a solid, such as the heat sink 44. Unlike a fluid, such as air, a solid, such as the heat sink 44, causes no transfer of heat with migration of materials, such as convection. Therefore, heat transfer in the heat sink 44 can be easily detected.

For this reason, the temperature of the LEDs 10 is measured with high accuracy based on the temperature of the heat sink 44 measured by the temperature measurement section 43, on condition the following matters are determined with adequacy, which are: the position where the LEDs 10 are mounted in the heat sink 44; the position where the temperature measurement section 43 is mounted in the heat sink 44; and the material configuring the heat sink 44 and the shape of the heat sink 44.

The temperature measurement section 43 may be arranged so that the influence of the heat received by the temperature measurement section 43 from the LEDs 10 will be larger than the influence of the heat received by the temperature measurement section 43 from the heat generating portion 41A in the LED drive 41. With this arrangement, the temperature measurement section 43 is able to measure the temperature of the LEDs 10 via the heat sink 44 without being influenced by the heat generated by the heat generating portion 41A of the LED drive 41, or by neglecting the influence of the heat generating portion 41A.

Let us assume that the LED drive 41 is provided independent of or separately from the LEDs 10 and the heat sink 44, as is the case in the vehicle headlights disclosed in the patent document JP-A-2007-035547 mentioned above. Comparing this configuration with the configuration of the present embodiment in which the LED drive 41 is mounted on the heat ink 44, the configuration of the present embodiment can reduce the size of the lighting apparatus 40. Further, in the present embodiment, the heat sink for releasing heat of the LEDs 10 also serves as a heat sink for releasing heat of the LED drive 41. Comparing this configuration with the configuration in which heat sinks for the LEDs 10 and the LED drive 41 are separately provided, the configuration of the present embodiment can reduce the size of the lighting apparatus 40.

In this way, the lighting fitting 1 including the lighting apparatus 40 of the present embodiment is also reduced in size, meeting the car manufacturer's request for reducing the size of the lighting fitting 1 as much as possible. Also, the distance from the LED drive 41 to the LEDs 10 is reduced to thereby shorten the wiring arranged between the LED drive 41 and the LEDs 10. Further, the current applied to the LEDs 10 is suppressed from being included with noise.

[Modification of the First Embodiment]

Figure 5:
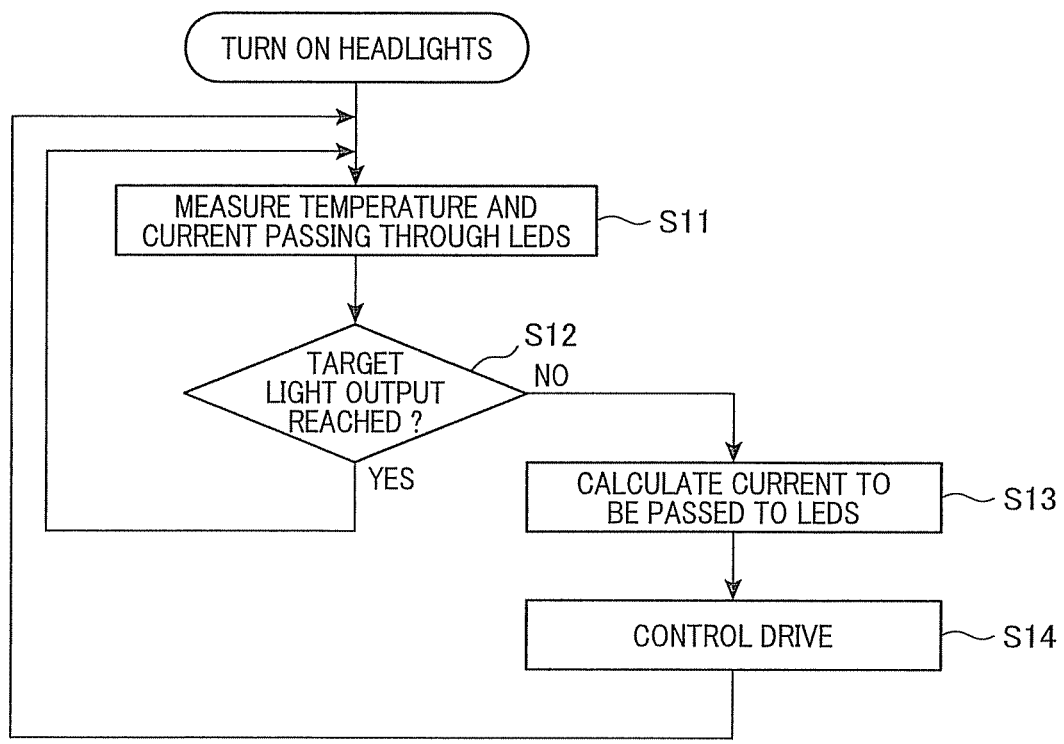
FIG. 5 is a flow diagram illustrating control of current applied to LEDs in a modification of the first embodiment.

Referring to FIGS. 5 and 6, hereinafter is described a modification according to the first embodiment of the present invention.

It should be appreciated that, in the present modification as well as in the subsequent embodiments, the components identical with or similar to those in the first embodiment are given the same reference numerals for the sake of omitting unnecessary explanation.

A lighting fitting of the present modification has a basic configuration similar to that of the first embodiment. However, control of current applied to LEDs is differently performed in the present modification from the first embodiment. In the present modification, control of current applied to LEDs is described referring to FIGS. 5 and 6, omitting description such as of other components.

Figure 6A:
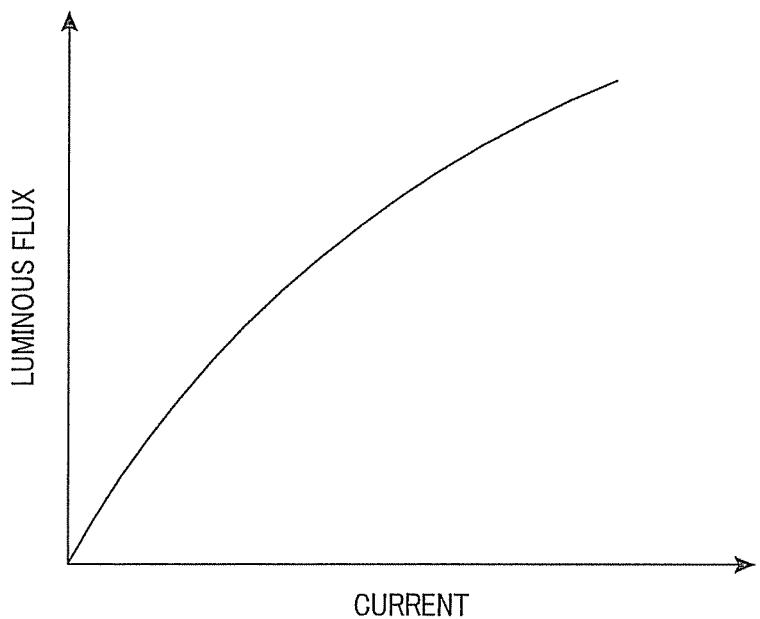
FIGS. 6A and 6B are graphs illustrating a correlation between current and luminous flux and a correlation between temperature and luminous flux, which are stored in a controller in advance.
Figure 6B:
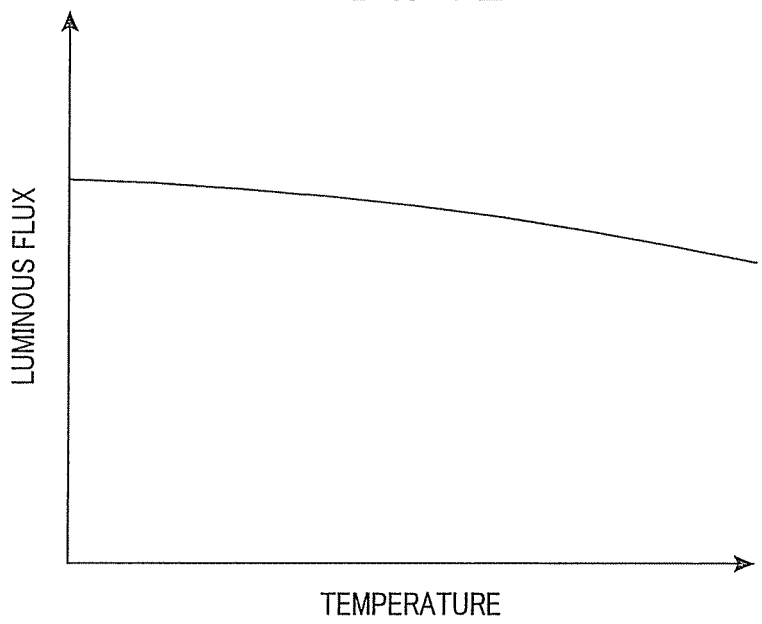

FIG. 5 is a flow diagram illustrating control of current applied to the LEDs 10 performed by the controller 42 of the vehicle lighting fitting 1 according to the present modification. FIG. 6A is a graph illustrating a correlation between current applied to the LEDs 10 and luminous flux emitted from the LEDs 10, which is stored in advance in the controller 42, according to the modification. FIG. 6B is a graph illustrating a correlation between temperature of the LEDs 10 and luminous flux emitted from the LEDs 10, which is stored in advance in the controller 42, according to the modification.

As shown in FIG. 5, when the driver of the vehicle inputs an instruction to light the lighting fitting 1 such as by turning on a headlight switch, a measurement signal outputted from the temperature measurement section 43 is inputted to the controller 42 (see FIG. 1) of the lighting fitting 1 and at the same time a signal indicative of the value of the current applied to the LEDs 10 is inputted to the controller 42 (step S11).

The controller 42 then determines whether or not the luminous flux, i.e. the light output, emitted from the LEDs 10 has reached a target value based on the inputted signals (step S12). Specifically, the controller 42 stores the graphs illustrated in FIGS. 6A and 6B. The controller 42 estimates the light output of the LEDs 10 based on the inputted signals and these graphs. First, the controller 42 estimates the light output of the LEDs 10 from the value of current applied to the LEDs 10 and the graph of FIG. 6A. Then, the controller 42 estimates the light output lowered being affected by the temperature of the LEDs 10 from the above estimated light output, the temperature of the LEDs 10 estimated based on the measurement signal of the temperature measurement section 43, and the graph of FIG. 6B.

If the estimated light output is equal to the target light output (YES in step S12), control returns to step S11 where the control described above is repeatedly performed. If the estimated light output is less than the target light output (NO in step S12), the controller 42 calculates a value of current to be applied to the LEDs 10, the value allowing the light output of the LEDs 10 to be the target light output (step S13).

For example, the controller 42 calculates an increase in current value necessary for making up the difference between the estimated light output and the target light output. The controller 42 then calculates a value of current to be applied to the LEDs 10, the value of current allowing the light output of the LEDs 10 to be the target light output. After that, the controller 42 outputs a control signal to the LED drive 41 to apply current of the calculated value to the LEDs 10 (step S14). Then, control returns to step S11 to repeat the control described above.

According to the configuration described above, the light output of the LEDs 10, and further, the light output of the lighting fitting 1 are controlled so as to be equal to the target light output. For example, when a current of the same value is applied to all of the LEDs 10 under the condition where those LEDs 10 which have different light output (LEDs 10 of different ranks) are mixed in, the value of current to be applied to the entire LEDs 10 can be controlled so that a light output equal to the target light output is obtained. As a result, the target light output is obtained from the LEDs 10 without severely ranking (binning) the LEDs 10.

The controller 42 may store graphs regarding one type of LEDs 10, which indicate correlations between current and light output and between temperature and light output, or may store graphs regarding a plurality of types of LEDs 10, which indicate correlations between current and light output and between temperature and light output. In the latter case, the controller 42 may select and determine, from among the stored graphs, the graphs in which the changes of current, temperature and output light agree with those of the type of the LEDs 10 actually mounted to the lighting apparatus 40. Further, the controller 42 is able to use, as bases, the correlations between current and output light and between temperature and output light, which correspond to the determined type of the LEDs 10 to control current to be applied to the LEDs 10. Thus, when the LEDs 10 emit light, the light output is rendered to be the target light output.

[Second Embodiment]

Figure 7:
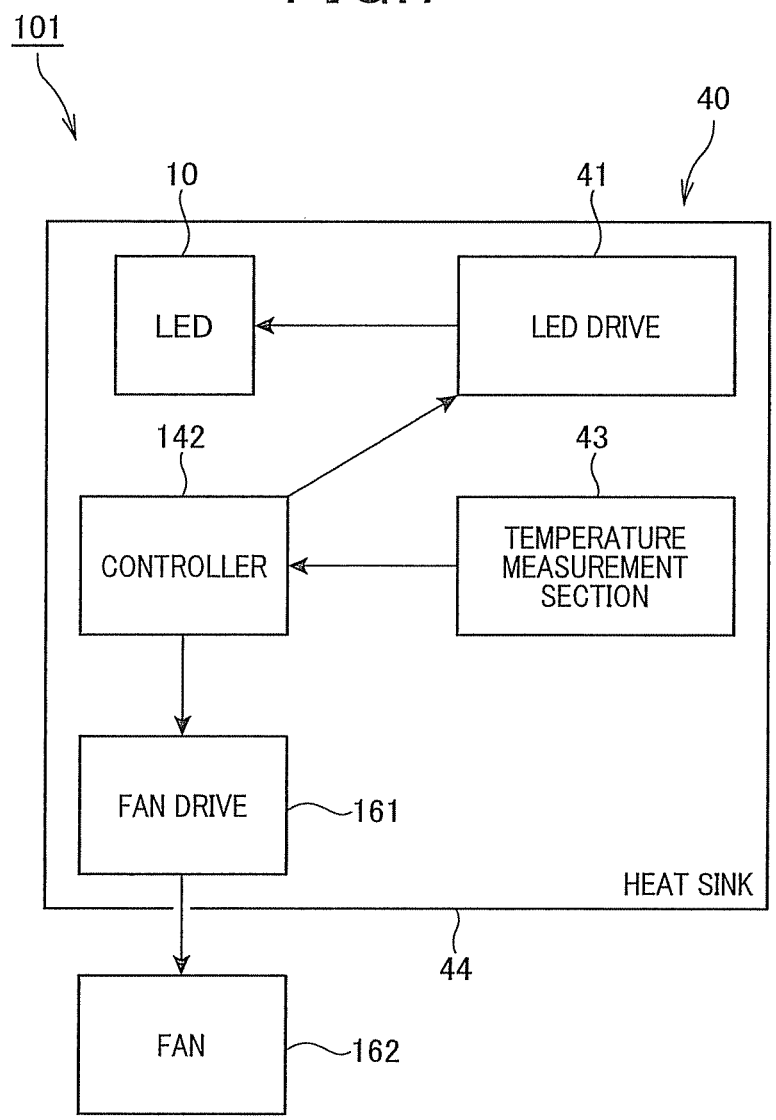
FIG. 7 is a block diagram illustrating the configuration of a vehicle lighting fitting according to a second embodiment of the present invention.
Figure 8:
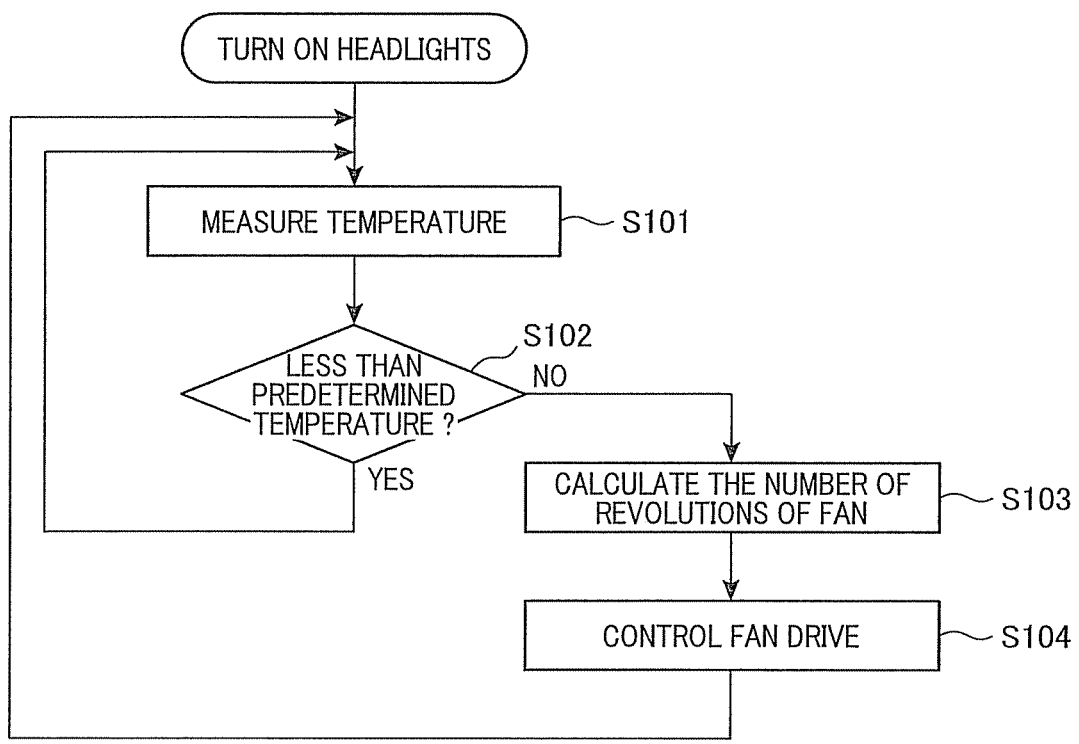
FIG. 8 is a flow diagram illustrating drive control of a fan in the vehicle lighting fitting illustrated in FIG. 7.

Referring now to FIGS. 7 and 8, hereinafter is described a second embodiment of the present invention.

A vehicle lighting fitting of the second embodiment has a basic configuration similar to that of the first embodiment. The second embodiment however is different from the first embodiment in that a fan is provided to cool the LEDs and the heat sink. In the present embodiment, the configuration and control of the fan is described referring to FIGS. 7 and 8 and description such as of other components is omitted.

FIG. 7 is a block diagram illustrating the configuration of a vehicle lighting fitting 101 according to the second embodiment. FIG. 8 is a flow diagram illustrating drive control of a fan 162 in the lighting fitting 101 illustrated in FIG. 7. As shown in FIG. 7, the lighting fitting 101 of the present embodiment includes the LEDs 10, the lighting apparatus 40, a fan drive 161 and the fan 162.

The fan drive 161 supplies current for driving the fan 162 and controls the number of revolutions of the fan 162. The fan drive 161 is inputted with a control signal from a controller 142 to control current to be supplied to the fan 162 according to the inputted control signal. The fan drive 161 is arranged at the heat sink 44 together with the LED drive 41, the controller 142, the temperature measurement section 43 and the like of the lighting apparatus 40.

The fan 162 blows air toward either the LEDs 10 or the heat sink 44 or both of the LEDs 10 and the heat sink 44 to cool them with the application of air. The configuration of the fan 162 may be a well-known configuration and thus is not particularly limited.

Hereinafter, control of the fan 162 in the lighting fitting 101 of the present embodiment will be described.

As shown in FIG. 8, when the driver of the vehicle inputs an instruction to light the lighting fitting 101 such as by turning on a headlight switch, a measurement signal outputted from the temperature measurement section 43 is inputted to the controller 142 (see FIG. 7) of the lighting fitting 101 (step S101).

The controller 142 then estimates the temperature of the LEDs 10 based on the inputted signal and determines whether or not the estimated temperature of the LEDs 10 falls within the target temperature range (step S102). If the estimated temperature of the LEDs 10 falls within the target temperature range (YES in step S102), control returns to step S101 where the control described above is repeatedly performed.

If the estimated temperature of the LEDs 10 is out of the target temperature range (NO in step S102), the controller 142 calculates the number of revolutions of the fan 162 (step S103). In this case, the controller 142 calculates the number of revolutions of the fan 162 such that the temperature of the LEDs 10 cooled by the air blown from the fan 162 will be less than a predetermined temperature. For example, if the estimated temperature of the LEDs 10 is out of the target temperature range, i.e. higher than the target temperature, the controller 142 calculates the number of revolutions so as to be higher than the number of revolutions of the moment. The controller 142 then calculates a value of current to be supplied from the fan drive 161 to the fan 162, based on the calculated number of revolutions. Further, the controller 142 outputs a control signal to the fan drive 161 to have the fan drive 161 output the calculated value of current (step S104).

The fan drive 161 inputted with the control signal supplies current of the calculated value to the fan 162. The fan 162 is rotated with the number of revolutions calculated by the controller 142 to increase the flow rate of the air blown from the fan 162. Thus, the quantity of heat released from the LEDs 10 and the heat sink 44 into the air is increased whereby the temperature of the LEDs 10 falls within the target temperature range.

The controller 142 may control, as described above, the number of revolutions of the fan 162 such that the temperature of the LEDs 10 will be less than a predetermined temperature. Alternatively, the controller 142 may control the number of revolutions of the fan 162 such that the light output of the LEDs 10 will be a target light output, similar to the modification of the first embodiment.

For example, when the temperature of the LEDs 10 increases and the light output is less than a target light output, the controller 142 may control the fan 162 so that the number of revolutions will be increased. Thus, the temperature of the LEDs 10 is decreased and the light output of the LEDs 10 is increased.

According to the configuration described above, the flow rate of the air blown to at least either of the heat sink 44 and the LEDs 10 is regulated by the controller 142. Thus, the light output and the temperature of the LEDs 10 are permitted to fall within predetermined ranges.

[Third Embodiment]

Figure 9:
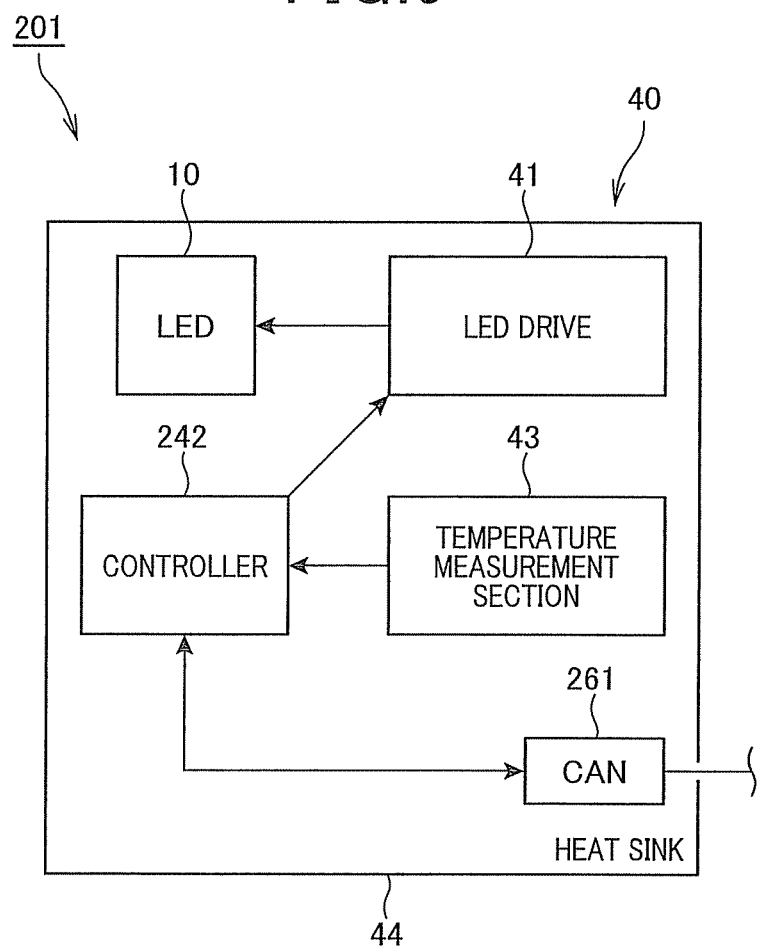
FIG. 9 is a block diagram illustrating the configuration of a vehicle lighting fitting according to a third embodiment of the present invention.
Figure 10:
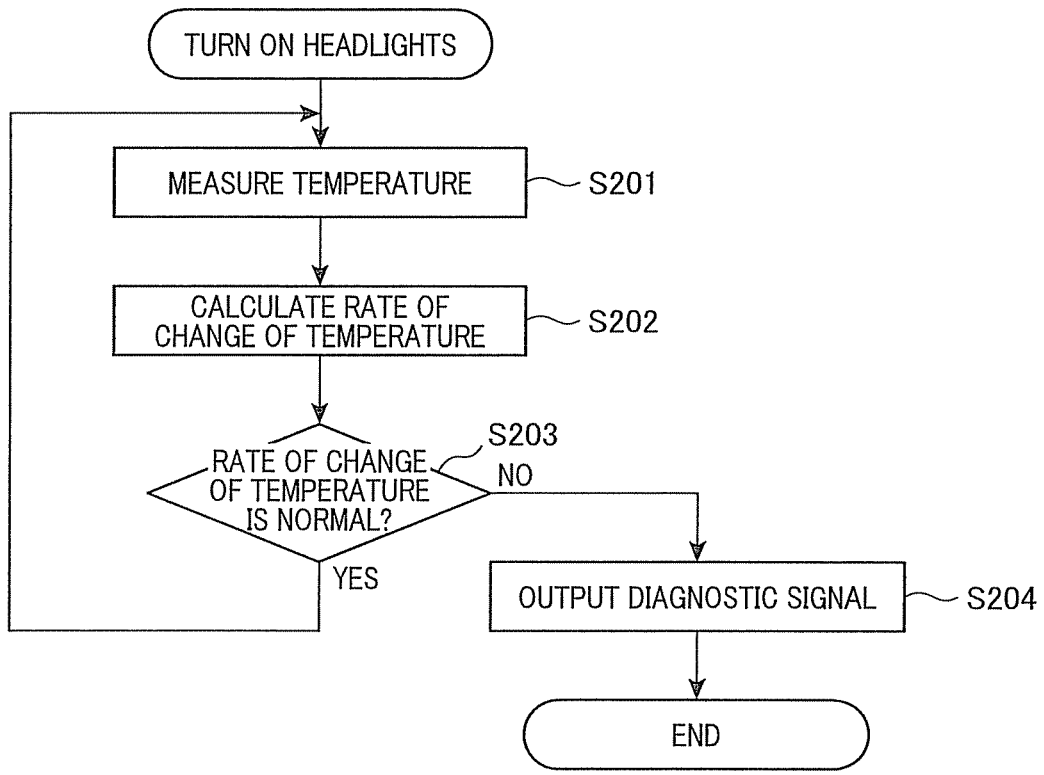
FIG. 10 is a flow diagram illustrating the process of determining occurrence of failure in an LED in the vehicle lighting fitting illustrated in FIG. 9.

Referring to FIGS. 9 and 10, hereinafter is described a third embodiment of the present invention.

A vehicle lighting fitting of the third embodiment has a basic configuration similar to that of the first embodiment. However, the third embodiment is different from the first embodiment in that the controller determines whether or not a failure has occurred in the LEDs. Referring to FIGS. 9 and 10, the present embodiment is described focusing on a process of failure determination made by the controller, omitting description such as of other components.

FIG. 9 is a block diagram illustrating the configuration of a vehicle lighting fitting 201 according to the third embodiment. FIG. 10 is a flow diagram illustrating the process of determining the occurrence of failure in the LEDs 10 of the lighting fitting 201 illustrated in FIG. 9. As shown in FIG. 9, the lighting fitting 201 of the present embodiment includes the LEDs 10, the lighting apparatus 40, a controller 242 and a CAN (Controller Area Network) 261.

The CAN 261 is an on-vehicle communication network that allows transmission and reception of information or signals between the controller 242 and sensors. The sensors include a vehicle speed sensor (not shown) for measuring the speed of the vehicle installing the lighting fitting and an outside air temperature sensor (not shown) for measuring the temperature outside the vehicle. The present embodiment is described taking as an example the case where the CAN 261 is used for the transmission of measurement signals to the controller 242. The measured signals include those which are associated with the vehicle speed measured by the vehicle speed sensor and those which are associated with the outside air temperature measured by the outside air temperature sensor.

Hereinafter is described the process of determining the occurrence of failure in the LEDs 10 of the lighting fitting 201 according to the present embodiment.

As shown in FIG. 10, when the driver of the vehicle inputs an instruction to light the lighting fitting 201 such as by turning on a headlight switch, a measurement signal outputted from the temperature measurement section 43 is inputted to the controller 242 (see FIG. 9) of the lighting fitting 201 (step S201).

The controller 242 estimates the temperature of the LEDs 10 based on the measurement signal inputted from the temperature measurement section 43 and calculates time variation of the estimated temperature (step S202). The controller 242 determines whether or not the calculated time variation of the temperature falls within a normal range (step S203). The controller 242 stores in advance time variation of a temperature when the LEDs 10 have normally operated.

In making a determination, the controller 242 refers to a measurement signal indicative of the vehicle speed and a measurement signal indicative of the outside air temperature, which are inputted via the CAN 261, while comparing the calculated time variation of temperature with the stored time variation of temperature. Referring to the vehicle speed and the outside air temperature, the controller 242 can make a determination based on the time variation of temperature, from which the temperature variation caused by the wind against the lighting fitting 201 and the influence of the outside air temperature are removed.

If the calculated time variation of temperature falls within a normal range (YES in step S203), control returns to step S201 where the process described above is repeatedly performed. If the calculated time variation of temperature is out of the normal range (NO in step S203), the controller 242 determines that a failure, such as chip short circuit, has occurred in the LEDs 10 and outputs a signal notifying the occurrence of a failure to a diagnostic device (not shown) (step S204).

The controller 242 may make a determination of the occurrence of a failure in the LEDs 10, as described above, by making a comparison of the calculated time variation of temperature with only the time variation of temperature when the LEDs 10 normally operate. Alternatively, the controller 242 may store, in advance, failure-specific time variations of temperatures of the LEDs 10 and make a determination as to the type of a failure in the LEDs 10 through the comparison of the calculated time variation of temperature with the stored failure-specific time variations of temperatures.

According to the configuration described above, failures, such as chip short circuit, in the LEDs 10 can be found. Specifically, the controller 242 determines whether or not the variation of temperature with the passage of time measured by the temperature measurement section 43 from the start of applying current to the LEDs 10 is the same as the variation of temperature when the LEDs 10 are normally operated, as stored in the controller 242 in advance. Thus, the controller 242 is able to determine whether or not a failure has occurred in the LEDs 10.

Further, the controller 242 may store in advance the variations of the temperatures with the passage of time of the LEDs 10 measured for each of types of failures by the temperature measurement section 43. Thus, the controller 242 can determine the variation from among the stored variations, with which the variation of a measured temperature with the passage of time agrees. Thus, the controller 242 can determine the type of a failure that has occurred in the LEDs 10.

[Fourth Embodiment]

Referring now to FIGS. 11 to 14, hereinafter is described a fourth embodiment of the present invention.

A vehicle lighting fitting of the fourth embodiment has a basic configuration similar to that of the first embodiment. However, the fourth embodiment is different from the first embodiment in that the direction of the light emitted from the LEDs is adjustable in the vertical direction. Referring to FIGS. 11 to 14, the, fourth embodiment is described focusing on a mechanism for regulating the direction of emitting light, omitting description such as of the components.

Figure 11:
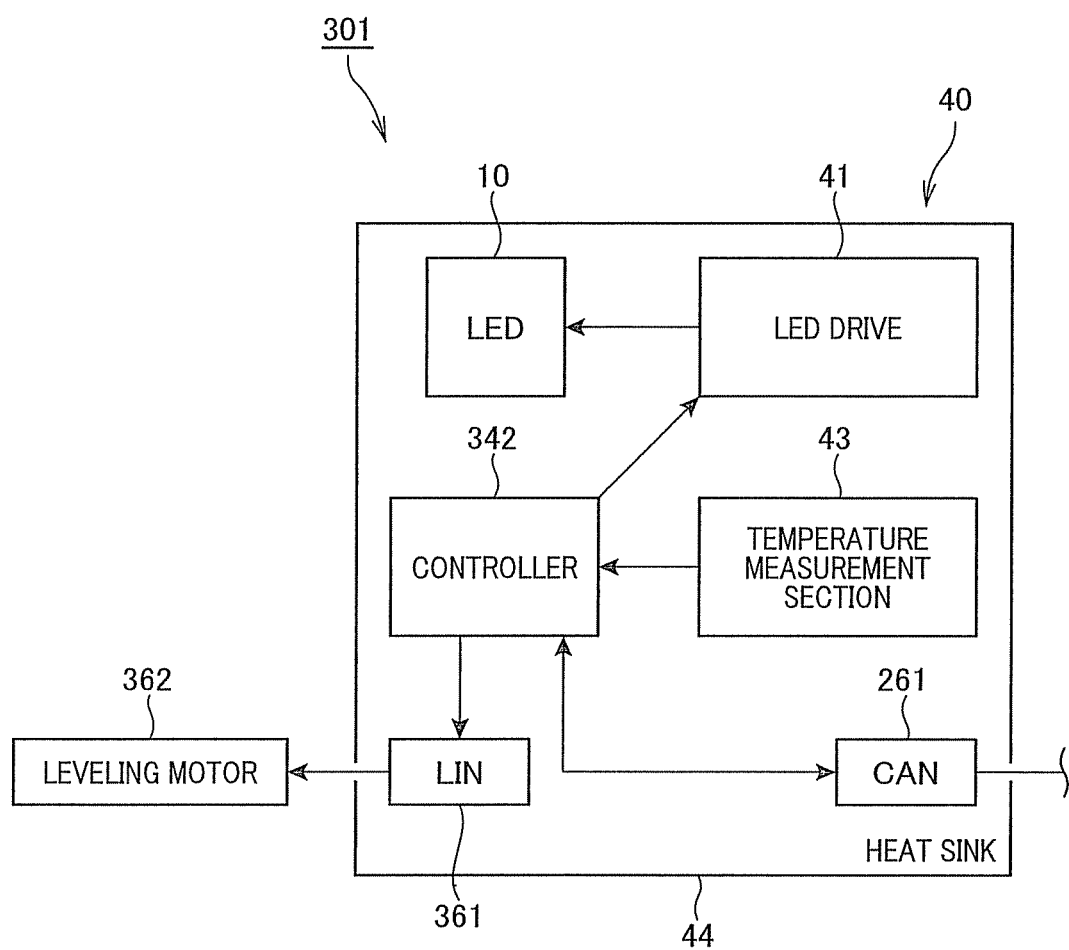
FIG. 11 is a block diagram illustrating the configuration of a vehicle lighting fitting according to a fourth embodiment of the present invention.

FIG. 11 is a block diagram illustrating the configuration a vehicle lighting fitting 301 according to the fourth embodiment. As shown in FIG. 11, the lighting fitting 301 of the fourth embodiment includes the LEDs 10, the lighting apparatus 40, the CAN 261, a LIN (Local Interconnect Network) 361, a leveling motor 362 and a controller 342.

The LIN 361 is an on-vehicle communication network that transmits control signals outputted from, the controller 342 to the leveling motor 362.

The leveling motor 362 changes the postures (orientations) such as of the LEDs 10, the reflectors 20 and the lenses 30 (see FIG. 1) to thereby vertically adjust the direction of the light emitted from the lighting fitting 301. The leveling motor 362 operates according to the control signals inputted from the controller 342.

Hereinafter, control of the direction of the light emitted from the lighting fitting 301 is described.

When the driver operates a switch, for example, intending to vertically adjust the direction of the light emitted from the lighting fitting 301, a signal resulting from the operation of the switch or the like is inputted to the controller 342 via the CAN 261. Based on the inputted signal, the controller 342 generates a control signal that drives the leveling motor 362 and outputs the generated control signal to the leveling motor 362 via the LIN 361. Upon input of the control signal, the leveling motor 362 changes the postures such as of the LEDs 10, the reflectors 20 and the lenses 30. Thus, the direction of the light emitted from the lighting fitting 301 is changed.

Figure 12:
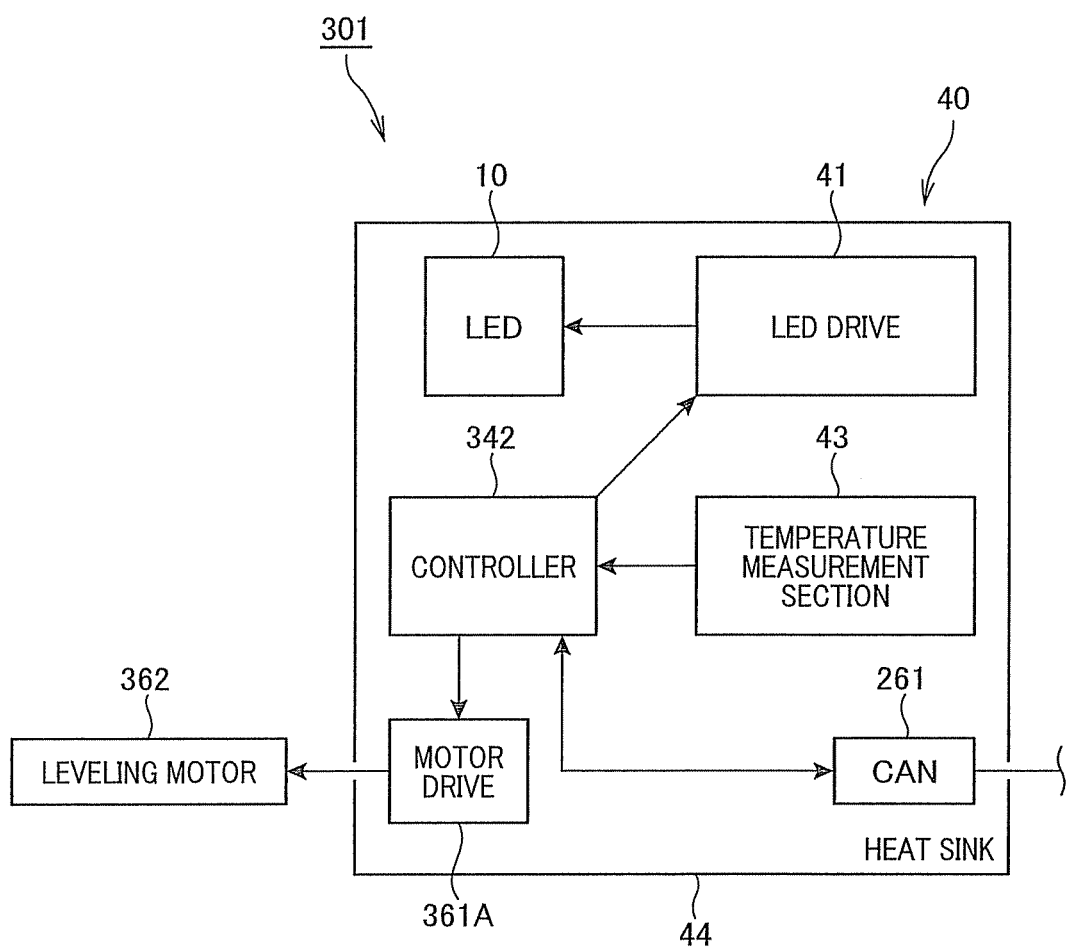
FIG. 12 is a block diagram illustrating a modification of the vehicle lighting fitting illustrated in FIG. 11.

FIG. 12 is a block diagram illustrating a modification of the vehicle lighting fitting illustrated in FIG. 11.

The controller 342 may directly drive the leveling motor 362, as described in the fourth embodiment, via the LIN 361. Alternatively, as shown in FIG. 12, the controller 342 may output a control signal to a motor drive 361A. In this case, the motor drive 361A may control current to be supplied to the leveling motor 362 according to the control signal, for the control of the operation of the leveling motor 362.

Figure 13:
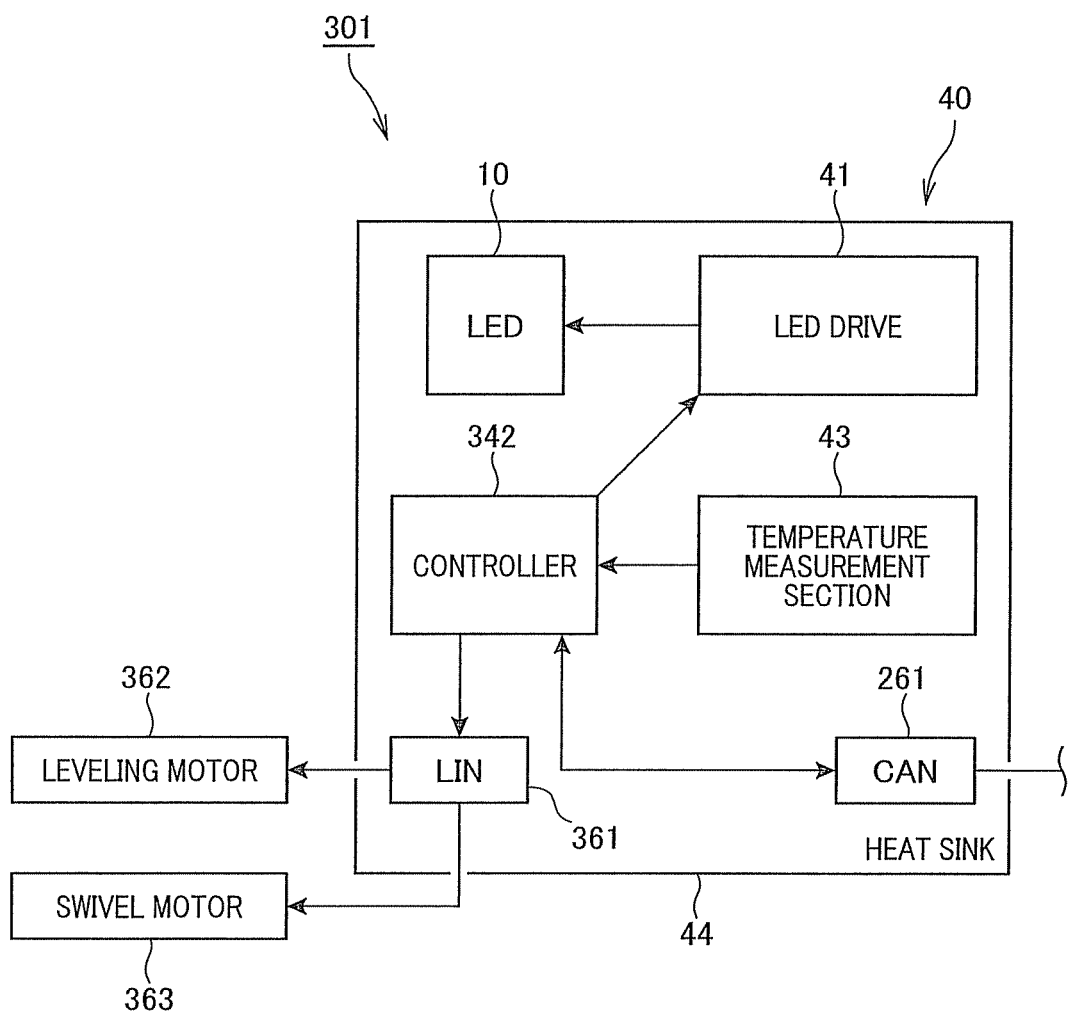
FIG. 13 is a block diagram illustrating another modification of the vehicle lighting fitting illustrated in FIG. 11.
Figure 14:
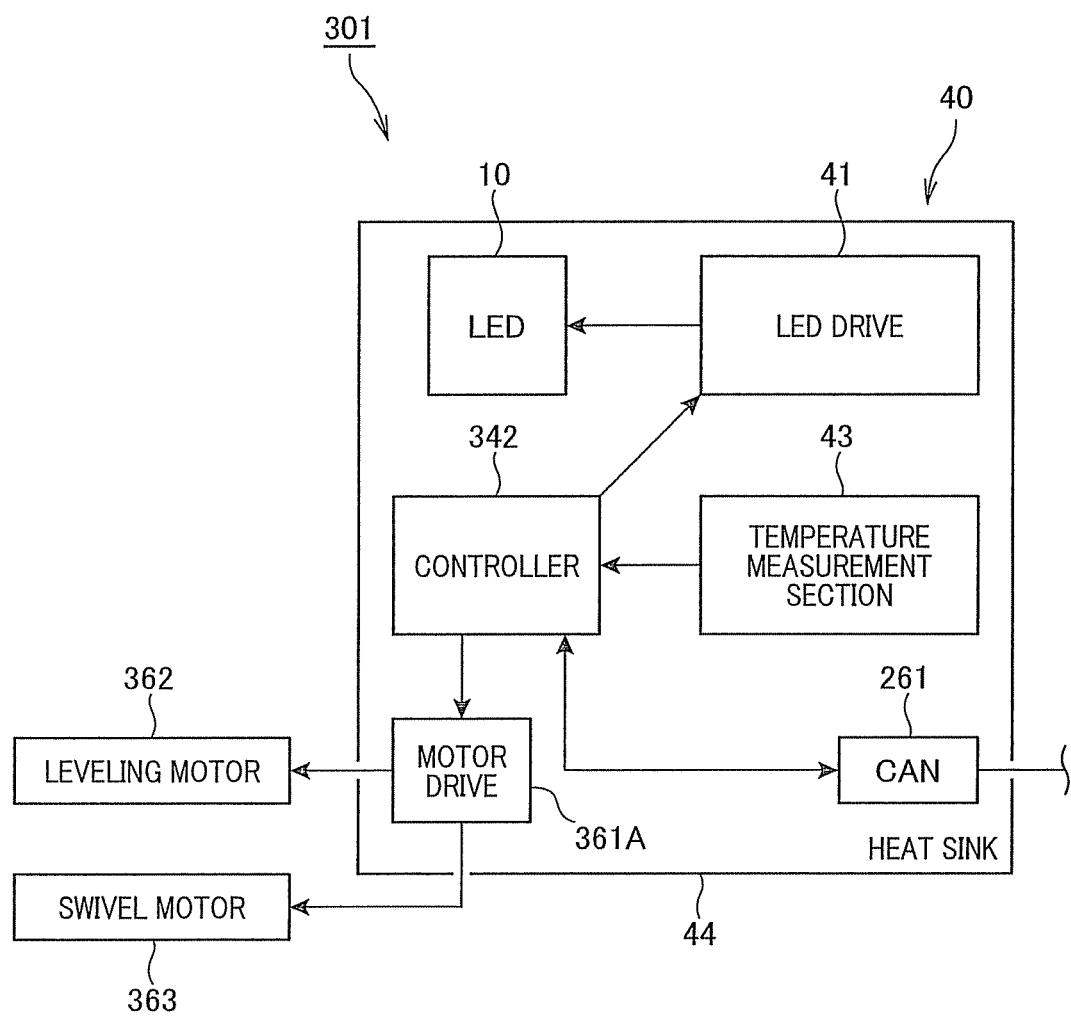
FIG. 14 is a block diagram illustrating still another modification of the vehicle lighting fitting illustrated in FIG. 12.

FIG. 13 is a block diagram illustrating another modification of the vehicle lighting fitting illustrated in FIG. 11. FIG. 14 is a block diagram illustrating still another modification of the vehicle lighting fitting illustrated in FIG. 12.

The direction of the light emitted from the lighting fitting 301 may be made adjustable only in the vertical direction as described in the fourth embodiment. Alternative to this, as shown in FIGS. 13 and 14, the lighting fitting 301 may be provided with a swivel motor that enables adjustment in the lateral direction. Using the swivel motor 363, the postures such as of the LEDs 10, the reflectors 20 and the lenses 30 may be changed for the lateral change of the direction of the light emitted from the lighting fitting 301.

In the modification illustrated in FIG. 13, the controller 342 drives the leveling motor 362 and the swivel motor 363 via the LIN 361. In the modification illustrated in FIG. 14, the controller 342 inputs a control signal into the motor drive 361A and the motor drive 361A drives the leveling motor 362 or the swivel motor 363.

[Fifth Embodiment]

Figure 15:
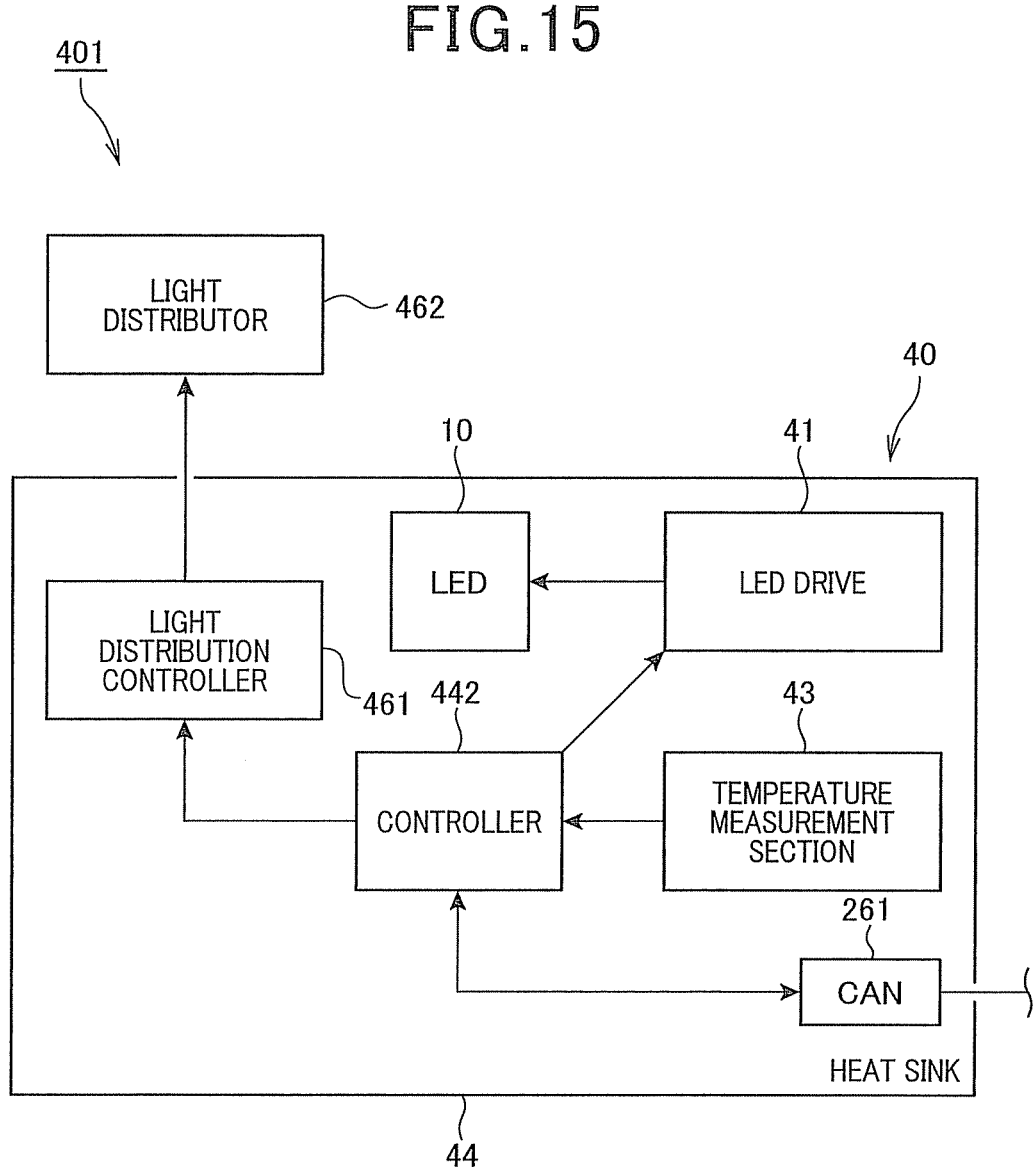
FIG. 15 is a block diagram illustrating the configuration of a vehicle lighting fitting according to a fifth embodiment of the present invention.

Referring to FIG. 15, hereinafter is described a fifth embodiment of the present invention.

A vehicle lighting fitting of the fifth embodiment has a basic configuration similar to that of the first embodiment. However, the fifth embodiment is different from the first embodiment in that the light distribution of the light emitted from the lighting fitting is controlled. Referring to FIG. 15, the fifth embodiment is described , focusing on a mechanism that adjusts the direction of light emission, omitting description such as of other components.

FIG. 15 is a block diagram illustrating the configuration of a vehicle lighting fitting according to the fifth embodiment. As shown in FIG. 15, the lighting fitting 401 of the fifth embodiment includes the LEDs 10, the lighting apparatus 40, the CAN 261, a light distribution controller 461, a light distributor 462 and a controller 442.

The light distribution controller 461 controls current to be supplied to the light distributor 462 based on a control signal outputted from the controller 442.

The light distributor 462 controls light distribution characteristics of the light emitted from the lighting fitting 401 such as by partially shading the light emitted from the LEDs 10. The present embodiment is described taking as an example the case where the light distributor 462 serves as a shade of which position or the like is controllable such as by a motor.

Hereinafter is described control of light distribution characteristics of the light emitted from the lighting fitting 401.

When the driver of the vehicle operates a switch, for example, intending to adjust light distribution characteristics of the light emitted from the lighting fitting 401, a signal resulting from the operation of the switch or the like is inputted to the controller 442 via the CAN 261. Based on the inputted signal, the controller 442 generates a control signal to be inputted to the light distribution controller 461 and outputs the generated control signal to the light distribution controller 461. Upon input of the control signal, the light distribution controller 461 supplies current to the motor of the light distributor 462 based on the control signal. Being supplied with current, the light distributor 462 that is a shade moves to a predetermined position to change the light distribution characteristics of the light emitted from the lighting fitting 401.

[Sixth Embodiment]

Figure 16:
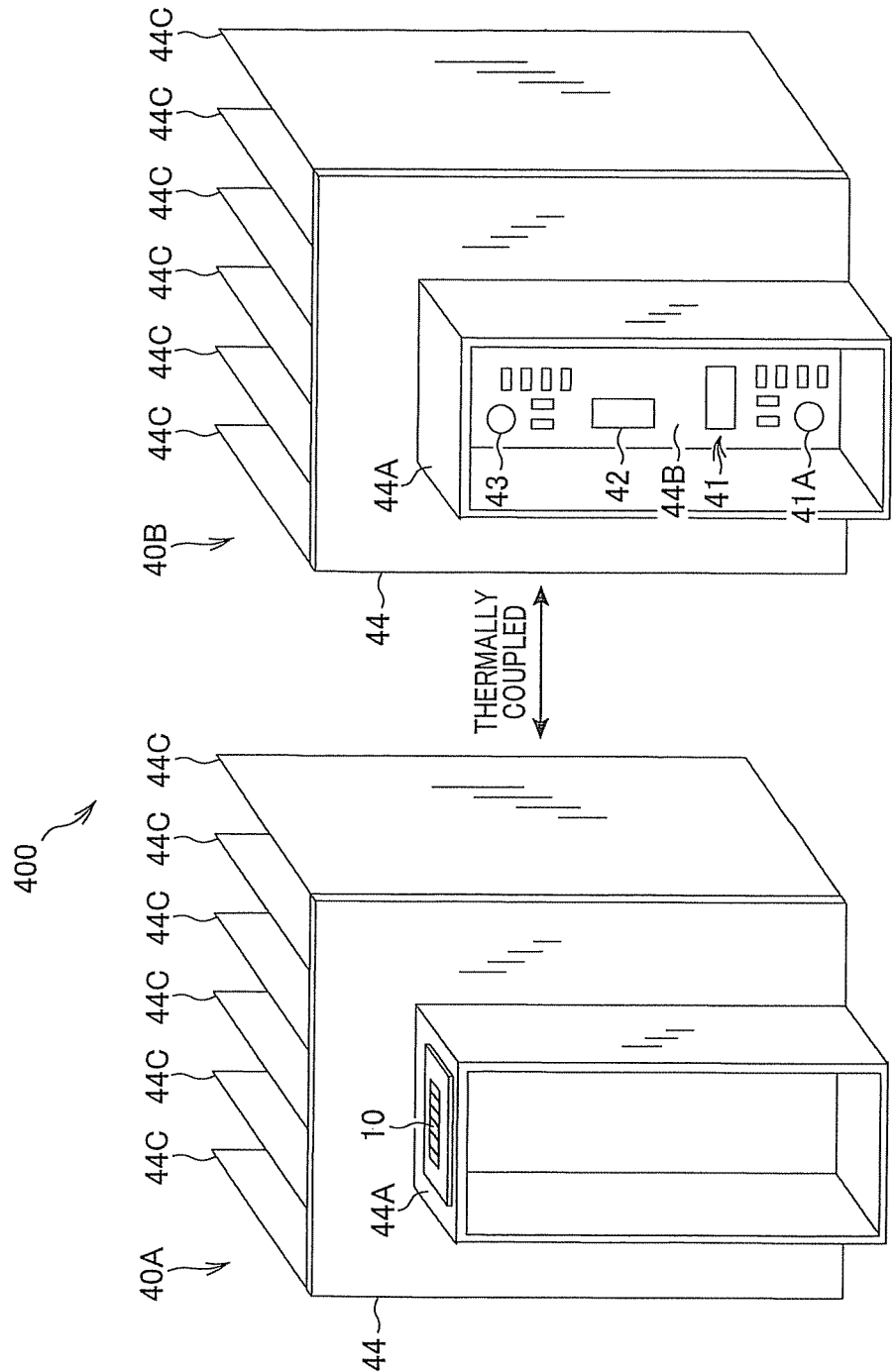
FIG. 16 is a perspective view illustrating the configuration of a lighting apparatus according to a sixth embodiment of the present invention.

Referring to FIG. 16, hereinafter is described a sixth embodiment of the present invention. A lighting apparatus of the sixth embodiment has a basic configuration similar to that of the first embodiment.

FIG. 16 is a perspective view illustrating the configuration of a lighting apparatus 400. In FIG. 16, the LEDs 10 and the LED drive 41 are mounted to the heat sink 40A and the heat sink 40B, respectively. The heat sink 40A and the heat sink 40B are thermally coupled to each other.

Hereinafter, aspects of the above-described embodiments will be summarized.

As an aspect of the embodiment, a lighting apparatus is provided which includes: a drive section which applies electric current to a light source which is a semiconductor element emitting light with application of electric current; at least one heat sink which is mounted with the light source and transfers heat generated by the emission of the light source; and a temperature measurement section which is mounted to the heat sink and measures temperature of the heat sink which is used for estimating temperature of the light source. The light source and the drive section are mounted to the same heat sink or to the heat sinks which are thermally coupled to each other.

According to the lighting apparatus of the present embodiment, the heat generated by light sources is transferred to the heat sink. The heat transferred to the heat sink is measured by the temperature measurement section. In other words, the temperature of the light sources is measured by the temperature measurement section not via a fluid, such as air, but via a solid, such as the heat sink.

Unlike a fluid, such as air, a solid, such as a heat sink, causes no transfer of heat with migration of materials, such as convection. Therefore, heat transfer in the heat sink can be easily detected.

For this reason, the temperature of the light sources can be estimated based on the temperature of the heat sink measured by the temperature measurement section, on condition the following matters are determined with adequacy, which are: the positions where the light sources are mounted in the heat sink; the position where the temperature measurement section is mounted in the heat sink; and the material configuring the heat sink and the shape of the heat sink.

In the lighting apparatus, at relative positions of the temperature measurement section, the light source, and a heat generating portion in the drive section, influence of heat received by the temperature measurement section from the light sources is larger than influence of heat received by the temperature measurement section from the heat generating portion in the drive section.

According to this configuration, the temperature measurement section can measure the temperature of the light sources via the heat sink without being affected by the heat generating portion in the drive section, or by neglecting the influence of the heat generating portion. As mentioned above, the temperature measurement section may be arranged at a position where the influence of the heat received from the light sources is relatively larger than the influence of the heat received from the heat generating portion in the drive section. Such a position for arranging the temperature measurement section, for example, may be a position where the distance from the temperature measurement section to the heat generating portion in the drive section is longer than the distance from the temperature measurement section to the light sources.

In the patent document JP-A-2007-035547 mentioned above, the drive section is provided being independent of and separate from the light sources and the heat sink. In this regard, in the present embodiment, the drive section is mounted to the heat sink, and thus, comparing with the configuration disclosed in the above patent document, the lighting apparatus of the present embodiment has a reduced size.

Also, in the present embodiment, a single heat sink has a function of releasing the heat of both the light sources and the drive section. Thus, comparing with the case where heat sinks are separately provided for the light sources and the drive section, the size of the lighting apparatus of the present embodiment is reduced.

Accordingly, the lighting fitting provided with the lighting apparatus of the present embodiment will also have a reduced size, meeting the manufacturer's request for reducing the size of a lighting fitting as much as possible. Also, in the present embodiment, the distance from the drive section to the light sources is reduced to thereby shorten the wiring arranged between the drive section and the light sources. Further, the current applied to the light sources is suppressed from being included with noise.

The lighting apparatus further includes a controller which controls the drive section. The controller stores a correlation between current and light output and a correlation between temperature and light output, which depend on the type of the semiconductor element, in advance, and the controller determines the type of the semiconductor element which is used as the light source to which current is applied by the drive section, and controls the current applied to the light source from the drive section depending on the determined type of the semiconductor element.

According to this configuration, current to be applied to the semiconductor elements (LEDs) that emit light of different characters is controlled, so that the temperature in emitting light falls within a desired range. Specifically, the drive section inputs information to the controller, regarding the current to be applied to the light sources and regarding the temperature measured by the temperature measurement section. Receiving the information, the controller can determine the type of the semiconductor elements emitting light and used as light sources, based on the correlation between current and light output and the correlation between temperature and light output, which depend on the types of the semiconductor elements used.

Further, the controller can control the current to be applied to the light sources based on the correlation between current and light output and the correlation between temperature and light output, which correspond to the type of semiconductor elements, as determined, that emit light. Under the current control, the light output and the temperature in the emission of light from the light sources are permitted to fall within a desired range.

In the lighting apparatus, the controller calculates a rate of temperature variation which is the variation with passage of time of the temperature measured by the temperature measurement section, and determines presence/absence of a failure of the light source based on the rate of temperature variation.

According to this configuration, a failure, such as chip short circuit, can be found in the semiconductor elements emitting light and serving as the light sources.

Specifically, the temperature measured by the temperature measurement section from when current is started to be applied to the light sources may vary with passage of time. The controller determines whether the variation with passage of time (time variation) of the temperature is the same as or different from the time variation of the temperature when the light sources normally operate, as stored in the controller in advance. Thus, the controller can determine whether or not a failure has occurred in the semiconductor elements emitting light and serving as the light sources.

Further, the controller can store, in advance, failure-specific time variations of temperatures measured by the temperature measurement section. Thus, the controller can determine the time variation with which the time variation of a measured temperature agrees, from among the time variations stored in the controller. In this way, the controller can determine the type of a failure that has occurred in the light sources.

The lighting apparatus further includes: a fan which blows air to at least one of the heat sink and the light source; and a controller which controls rotation of the fan based on the temperature measured by the temperature measurement section. The controller stores a correlation between current and light output and a correlation between temperature and light output of the light source, and the controller controls the number of revolutions of the fan so that at least one of the light output of the light source and the temperature of the light source falls within a predetermined range.

According to this configuration, the flow rate of the air blown to at least either of the heat sink and the light sources is regulated under the control of the controller. Thus, the light output of the light sources or the temperature of the light sources is permitted to fall within the predetermined range.

The controller receives information regarding temperature measured by the temperature measurement section, as well as information regarding current to be applied to the light sources from the drive section. The controller calculates current-information-based light output from the inputted information regarding current and the correlation between current and light output. The controller then estimates a light output of the light sources from the inputted information regarding temperature, the current-information-based light output, and the correlation between temperature and light output.

For example, when an estimated light output is decreased due to the increase of temperature of the light sources and falls out of the predetermined range, the controller outputs a control signal to the fan. Upon input of the control signal to the fan, the number of revolutions of the fan is increased to directly decrease the temperature of the light sources, or to decrease the temperature of the heat sink for the indirect decrease of the temperature of the light sources. Thus, the estimated light output of the light sources is increased and falls within the predetermined range.

Conversely, when the temperature of the light sources is exceedingly decreased to increase an estimated light output, allowing the estimated light output to fall out of the predetermined range, the controller outputs a control signal to the fan. Upon input of the control signal to the fan, the number of revolutions of the fan is decreased to directly increase the temperature of the light sources, or to increase the temperature of the heat sink for the indirect increase of the temperature of the light sources. Thus, the estimated light output of the light sources is decreased and falls within the predetermined range.

It is difficult to uniformly determine the "predetermined range" of light output or temperature of light sources, which is usable in all technical fields. This is because the allowable variation range of light output depends on the technical field in which the lighting apparatus is used. However, for example, the predetermined range can be exemplified as a range that will not allow the users to perceive or will allow the users to hardly perceive the variation of luminance in the area where light is emitted from the light sources.

As another aspect of the embodiment, a lighting fitting is provided which includes: a light source which is a semiconductor element emitting light with application of electric current; the above lighting apparatus; and a casing which accommodates the light source and the lighting apparatus.

According to the light fitting of the present embodiment, the temperature of the light sources is measured with high accuracy, owing to the lighting apparatus of the present embodiment.

According to the lighting apparatus and the lighting fitting of the present embodiment, the temperature of the light sources can be measured by the temperature measurement section not via a fluid, such as air, but via a solid, such as a heat sink. Accordingly, the lighting apparatus and the lighting fitting of the present embodiment can measure the temperature of the light sources with high accuracy.

It will be appreciated that the present invention is not limited to the configurations described above, but any and all modifications, variations or equivalents, which may occur to those who are skilled in the art, should be considered to fall within the scope of the present invention.

What is claimed is:

1. A lighting apparatus, comprising:
a drive section which applies electric current to a light source which is a semiconductor element emitting light with application of electric current;
at least one heat sink which is mounted with the light source and transfers heat generated by the emission of the light source; and
a temperature measurement section which is mounted to the heat sink and measures temperature of the heat sink which is used for estimating temperature of the light source, wherein
the light source and the drive section are mounted to the same heat sink or to the heat sinks which are thermally coupled to each other; and
at relative positions of the temperature measurement section, the light source, and a heat generating portion in the drive section, influence of heat received by the temperature measurement section from the light sources is larger than influence of heat received by the temperature measurement section from the heat generating portion in the drive section.

2. The lighting apparatus according to claim 1, further comprising
a controller which controls the drive section, wherein
the controller stores a correlation between current and light output and a correlation between temperature and light output, which depend on the type of the semiconductor element, in advance, and
the controller determines the type of the semiconductor element which is used as the light source to which current is applied by the drive section, and controls the current applied to the light source from the drive section depending on the determined type of the semiconductor element.

3. The lighting apparatus according to claim 1, further comprising:
a fan which blows air to at least one of the heat sink and the light source; and
a controller which controls rotation of the fan based on the temperature measured by the temperature measurement section, wherein
the controller stores a correlation between current and light output and a correlation between temperature and light output of the light source, and
the controller controls the number of revolutions of the fan so that at least one of the light output of the light source and the temperature of the light source falls within a predetermined range.

4. A lighting fitting, comprising:
a light source which is a semiconductor element emitting light with application of electric current;
the lighting apparatus according to claim 1; and
a casing which accommodates the light source and the lighting apparatus.

5. A lighting apparatus, comprising:
a drive section which applies electric current to a light source which is a semiconductor element emitting light with application of electric current;
at least one heat sink which is mounted with the light source and transfers heat generated by the emission of the light source; and
a temperature measurement section which is mounted to the heat sink and measures temperature of the heat sink which is used for estimating temperature of the light source, wherein the light source and the drive section are mounted to the same heat sink or to the heat sinks which are thermally coupled to each other;

the controller calculates a rate of temperature variation which is the variation with passage of time of the temperature measured by the temperature measurement section, and determines presence/absence of a failure of the light source based on the rate of temperature variation.

6. The lighting apparatus according to claim 5, further comprising a controller which controls the drive section, wherein the controller stores a correlation between current and light output and a correlation between temperature and light output, which depend on the type of the semiconductor element, in advance, and the controller determines the type of the semiconductor element which is used as the light source to which current is applied by the drive section, and controls the current applied to the light source from the drive section depending on the determined type of the semiconductor element.

7. The lighting apparatus according to claim 5, further comprising:

a fan which blows air to at least one of the heat sink and the light source; and a controller which controls rotation of the fan based on the temperature measured by the temperature measurement section, wherein the controller stores a correlation between current and light output and a correlation between temperature and light output of the light source, and the controller controls the number of revolutions of the fan so that at least one of the light output of the light source and the temperature of the light source falls within a predetermined range.

8. A lighting fitting, comprising:

a light source which is a semiconductor element emitting light with application of electric current;

the lighting apparatus according to claim 5; and a casing which accommodates the light source and the lighting apparatus.

* * * * *